United States Patent
Kumar et al.

(10) Patent No.: US 11,141,707 B2
(45) Date of Patent: Oct. 12, 2021

(54) INLET DIFFUSER FOR FIXED-BED REACTORS

(71) Applicant: Indian Oil Corporation Limited, Mumbai (IN)

(72) Inventors: Pravesh Kumar, Faridabad (IN); Darshankumar Manubhai Dave, Faridabad (IN); Ramesh Karumanchi, Faridabad (IN); Sarvesh Kumar, Faridabad (IN); Madhusudan Sau, Faridabad (IN); Gurpreet Singh Kapur, Faridabad (IN); Sankara Sri Venkata Ramakumar, Faridabad (IN)

(73) Assignee: INDIAN OIL CORPORATION LIMITED, Mumbai (IN)

(*) Notice: Subject to any disclaimer, the term of this patent is extended or adjusted under 35 U.S.C. 154(b) by 0 days.

(21) Appl. No.: 16/890,153

(22) Filed: Jun. 2, 2020

(65) Prior Publication Data
US 2020/0376455 A1    Dec. 3, 2020

(30) Foreign Application Priority Data
Jun. 3, 2019    (IN) .............................. 201921022026

(51) Int. Cl.
B01J 8/02    (2006.01)
B01J 4/00    (2006.01)
B01J 4/02    (2006.01)

(52) U.S. Cl.
CPC ............... *B01J 8/0278* (2013.01); *B01J 4/02* (2013.01); *B01J 2204/002* (2013.01); *B01J 2208/00929* (2013.01); *B01J 2208/00938* (2013.01)

(58) Field of Classification Search
CPC .................... B01J 8/0278; B01J 8/0492; B01J 2208/00938; B01J 2208/00929; B01J 4/005; B01J 2204/002
See application file for complete search history.

(56) References Cited

U.S. PATENT DOCUMENTS 5,152,967 A    10/1992    Rossetti et al.
5,462,719 A    10/1995    Pedersen et al.

*Primary Examiner* — Lessanework Seifu
(74) *Attorney, Agent, or Firm* — Workman Nydegger

(57) ABSTRACT

An inlet diffuser for the fixed-bed reactor is disclosed. The inlet diffuser comprises a truncated cone adapted to receive a stream of gas-liquid mixture. The truncated cone includes at least one opening formed on a circumference of the truncated cone. Further, the inlet diffuser comprises a vertical baffle plate in each of the openings and at least one horizontal baffle coupled to the truncated cone to absorb momentum of the stream received by the truncated cone. Furthermore, it comprises a cylindrical chamber in fluid communication with the truncated cone and adapted to receive the stream from the truncated cone. The cylindrical chamber includes at least one slot to discharge the stream from the inlet diffuser and a splash plate is disposed at a bottom portion of the cylindrical chamber with apertures to discharge the stream from the inlet diffuser.

10 Claims, 2 Drawing Sheets

INLET DIFFUSER FOR FIXED-BED REACTORS

FIELD OF THE INVENTION

The present disclosure generally relates to inlet diffusers and more particularly, relates to an inlet diffuser for efficient distribution of fluid on a distribution tray in a down-flow fixed-bed reactor.

BACKGROUND OF THE INVENTION

As is generally known, the processes of hydroprocessing carried out during petroleum refining involves various chemical production reactors, with fixed bed reactors being a major one. The fixed bed reactors featuring co-current down-flow of gas or gas-liquid mixtures through beds of solid catalyst require efficient fluid distribution at the inlet of the reactor. In order to achieve optimal reactor performance and efficient control over the reactor, the fluids are required to be uniformly distributed across the entire catalyst bed area, thereby, enabling all of the catalyst to be contacted by the flowing reactant fluids.

The reactor flow distribution begins in the inlet nozzle where fluids are dispersed over the downstream trays or catalyst beds. These reactors are typically fed by a single inlet line approaching horizontally and connecting to a 90° elbow directed downward into the reactor vessel. The elbow, attached to the vessel's top flange, leads to an expanded cylindrical manway mounted on the hemispherical or elliptical reactor head. Further, there is an inlet nozzle distributor below the vessel entrance.

Moreover, the stringent fuel quality norms have renewed focus on higher catalytic activity and state of the art reactor internals to maximize catalyst utilization while improving unit reliability. Effective catalyst utilization, optimum liquid-gas distribution, and low radial temperature difference are the important factors that affect the performance of the reactor. Uneven catalyst loading, non-uniform liquid distribution, and low radial dispersion lead to channeling. The non-uniform liquid distribution results in low reactor efficiency, catalyst stability and shortens the catalyst life. It is well known that the hot spots are created due to the liquid flow maldistribution in the reactor giving rise to undesired reactions leading to deactivation of catalyst and low conversion. Thus, the uniform distribution of the liquid over the catalyst is essential to achieve maximum utilization of catalyst and to avoid the potential risks caused by stagnant zones and channeling. Reactor internals plays a major role in improving unit performance. The inlet diffuser in a downflow fixed bed reactor absorbs the momentum of incoming liquid thus prevents the reactor shell and distribution plate from damage due to erosion because of high velocity. Moreover, it helps to maintain a uniform liquid level on the distribution plate thus leading to the uniform distribution on the top of the catalyst bed. A good diffuser should absorb the momentum of entering liquid and ensure a uniform level on the tray with a minimum pressure drop.

However, the conventional diffusers used in the industry either provide swirling motion to the liquid resulting in a ripple effect on the distribution tray or the liquid flow is in one direction creating liquid level gradient on the tray leading to uneven liquid flow from the gas-liquid distributor on the catalyst bed. A low-pressure drop for inlet diffuser is critical as diffuser pressure drop contributes to the total loop pressure drop for the recycle gas compressor. Therefore, an increase in diffuser pressure drop will increase the workload for the recycle gas compressor. In order to overcome the said problem, an effective inlet nozzle distributor should accomplish at least four objectives.

First, the diffuser should erase all angular and radial asymmetries imparted by the approach piping, thereby achieving uniform flow coverage over the tray or solids bed below the tray. In general, a flow bias will exist towards the outer wall of the inlet elbow, and for gas-liquid mixtures, this may result in phase segregation at the reactor inlet.

Second, the hardware should reduce, or break the entering fluid momentum to prevent high-velocity erosion of the shell, internals or solids bed. This deceleration is particularly important when the pre-distribution tray does not reach the reactor wall. Liquid contacting at high velocity can splash off this pre-distribution tray to the final distribution tray, thus compromising two-phase distribution.

Third, the pressure drop across the inlet nozzle must be acceptable for optimal reactor flow rates. Finally, the diffuser design must not permit excessive coke and solids accumulation.

For two-phase processes, poor fluid distribution will negatively impact the completeness and uniformity of catalyst wetting. This flow maldistribution will decrease effective catalyst activity and may lead to lateral temperature differences in the bed, leading to off-spec products, higher temperature requirements, poorer product selectivities and faster catalyst deactivation. In gas-phase reactors, ineffective distribution can create high-velocity eddies in the reactor head, leading to erosion of the solids bed.

By way of example, U.S. Pat. No. 5,152,967 discloses the use of a vaned swirl chamber in a fixed bed reactor quench zone located between two catalytic beds. While another U.S. Pat. No. 5,462,719 discloses a method and apparatus for mixing two reactants within a column such as a process stream of both gas and liquid phases, and a quench gas. The apparatus is located beneath the lower end of an upper catalyst bed in a column.

However, the swirling motion of the fluid provided by the inlet nozzles known in the art often leads to the formation of waves of liquid on the distribution tray, thereby leading to uneven liquid levels across the surface of the distribution tray.

The uneven distribution of the liquid results in non-uniform liquid distribution on the catalyst bed, and therefore affects the performance of the reactor. Furthermore, in the absence of the swirl chamber, the liquid flow is in one direction creating a liquid level gradient on the tray leading to uneven distribution and high velocity may cause erosion in the reactor shell and the distribution tray. Therefore, the inlet nozzles known in the art fail to address the problems mentioned above and there arises a need for an inlet diffuser for a fixed bed reactor causing a uniform distribution of the fluid on the catalyst bed without causing erosion in the reactor shell and the distribution tray.

SUMMARY OF THE INVENTION

This summary is provided to introduce a selection of concepts in a simplified format that are further described in the detailed description of the present disclosure. This summary is not intended to identify key or essential inventive concepts of the present disclosure, nor is it intended for determining the scope of the present disclosure.

In an embodiment of the present disclosure, a fixed-bed reactor for uniform liquid distribution is disclosed. The fixed-bed reactor includes a feed pipe for introducing a stream of gas-liquid mixture into the reactor. The reactor further includes a catalyst bed with catalyst downstream to the feed pipe. Furthermore, a distribution tray with distribution units are placed above the catalyst bed for distributing the stream of gas-liquid mixture on the catalyst bed. The reactor also includes an inlet diffuser between the feed pipe and the distribution tray for uniformly distributing the stream of gas-liquid mixture on the distribution tray and an outlet for conveying the stream of gas-liquid mixture out of the reactor.

In another embodiment of the present disclosure, an inlet diffuser for a fixed-bed reactor is disclosed. The inlet diffuser includes a truncated cone adapted to receive a stream of gas-liquid mixture, wherein the truncated cone includes at least one opening formed on a circumference of the truncated cone. Further, the inlet diffuser includes a vertical baffle plate (120) in each of the one or more openings (110) in truncated cone (106) to break the stream. Also, it includes at least one horizontal baffle coupled to the truncated cone and adapted to absorb momentum of the stream received by the truncated cone. The inlet diffuser also includes a cylindrical chamber in fluid communication with the truncated cone and adapted to receive the stream from the truncated cone, wherein the cylindrical chamber includes at least one slot adapted to discharge the stream from the inlet diffuser. Furthermore, a splash plate is disposed at a bottom portion of the cylindrical chamber and comprising one or more apertures adapted to discharge the stream from the inlet diffuser.

The disclosed embodiment of the inlet diffuser including a conical section absorbs the momentum of incoming liquid by splashing it inside inlet diffuser, followed by a cylindrical section for uniformly distributing the liquid on the distribution tray. The outflow area of cylindrical part is divided into different sections to avoid liquid level gradient on the tray. Moreover, as the entering fluid momentum is absorbed by the conical section, the velocities at the outlet of diffuser are bare minimum to cause any ripple effect resulting in uniform liquid level on the distribution tray, and preventing the reactor shell from erosion. Moreover, the liquid flow will be uniform from all the distribution unit.

To further clarify advantages and features of the present disclosure, a more particular description of the disclosure will be rendered by reference to specific embodiments thereof, which is illustrated in the appended drawings. It is appreciated that these drawings depict only typical embodiments of the disclosure and are therefore not to be considered limiting of its scope. The disclosure will be described and explained with additional specificity and detail with the accompanying drawings.

BRIEF DESCRIPTION OF DRAWINGS

To further clarify advantages and features of the present disclosure, a more particular description of the disclosure will be rendered by reference to specific embodiments thereof, which is illustrated in the appended drawing. It is appreciated that these drawings depict only typical embodiments of the disclosure and are therefore not to be considered limiting its scope. The disclosure will be described and explained with additional specificity and detail with the accompanying drawings in which.

Figure 1:
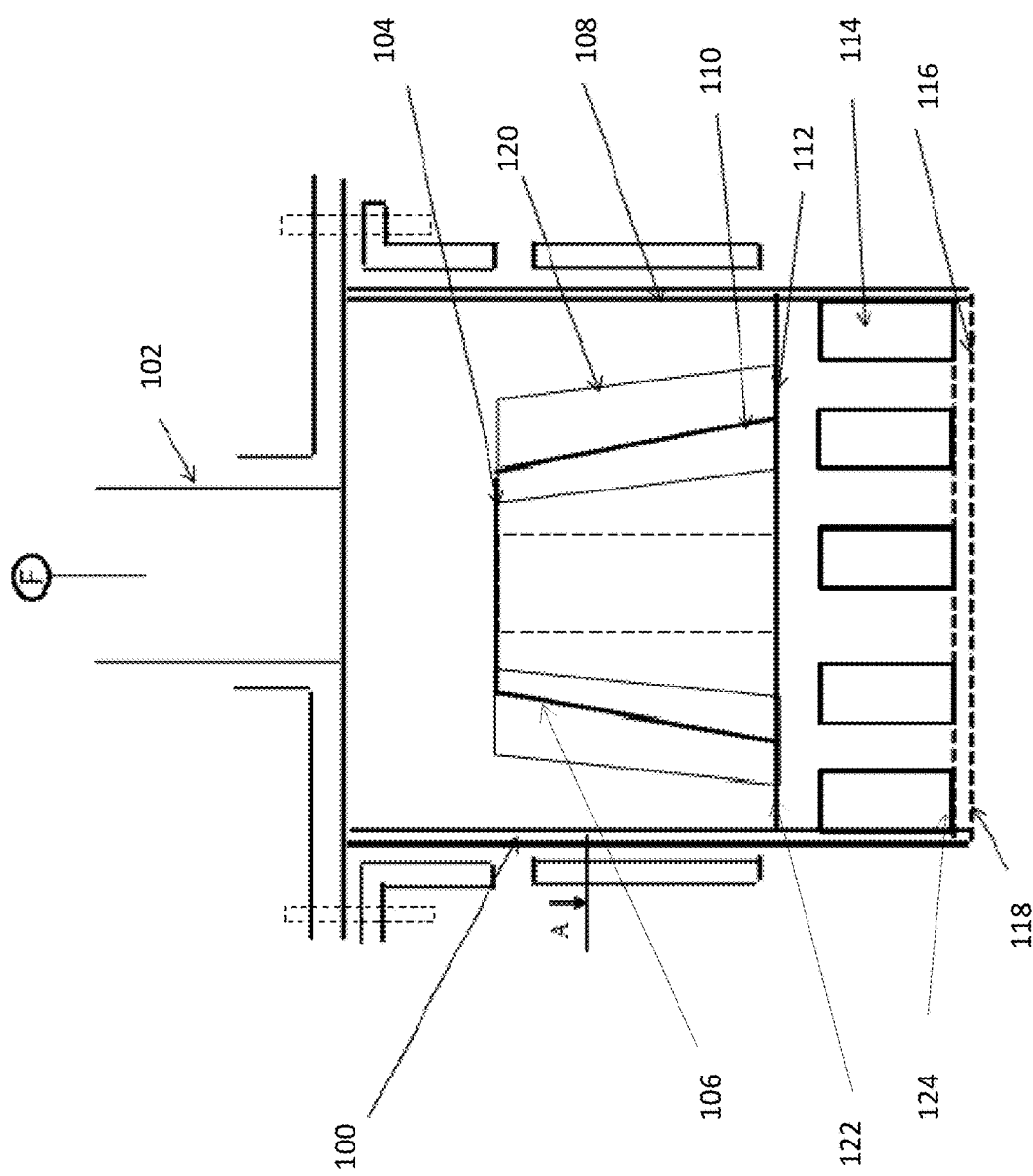
FIG. 1 illustrates schematic view of an inlet diffuser for a fixed-bed reactor, in accordance with another embodiment of the present disclosure.

Further, skilled artisans will appreciate that elements in the drawings are illustrated for simplicity and may not have necessarily been drawn to scale. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION OF DRAWINGS

For the purpose of promoting an understanding of the principles of the invention, reference will now be made to the embodiment illustrated in the drawings, and specific language will be used to describe the same. It will nevertheless be understood that no limitation of the scope of the invention is thereby intended. Such alterations and further modifications in the illustrated system, and such further applications of the principles of the invention as illustrated therein would be contemplated as would normally occur to one skilled in the art to which the invention relates. Unless otherwise defined, all technical and scientific terms used herein have the same meaning as commonly understood by one of ordinary skilled in the art. The system, methods, and examples provided herein are illustrative only and are not intended to be limiting.

The term "some" as used herein is to be understood as "none or one or more than one or all." Accordingly, the terms "none," "one," "more than one," "more than one, but not all" or "all" would all fall under the definition of "some." The term "some embodiments" may refer to no embodiments or to one embodiment or to several embodiments or to all embodiments, without departing from the scope of the present disclosure.

The terminology and structure employed herein is for describing, teaching, and illuminating some embodiments and their specific features. It does not in any way limit, restrict or reduce the spirit and scope of the claims or their equivalents.

More specifically, any terms used herein such as but not limited to "includes," "comprises," "has," "consists," and grammatical variants thereof do not specify an exact limitation or restriction and certainly do not exclude the possible addition of one or more features or elements, unless otherwise stated, and furthermore must not be taken to exclude the possible removal of one or more of the listed features and elements, unless otherwise stated with the limiting language "must comprise" or "needs to include."

Whether or not a certain feature or element was limited to being used only once, either way, it may still be referred to as "one or more features" or "one or more elements" or "at least one feature" or "at least one element." Furthermore, the use of the terms "one or more" or "at least one" feature or element do not preclude there being none of that feature or element, unless otherwise specified by limiting language such as "there needs to be one or more . . . " or "one or more element is required."

Unless otherwise defined, all terms, and especially any technical and/or scientific terms, used herein may be taken to have the same meaning as commonly understood by one having ordinary skills in the art.

Reference is made herein to some "embodiments." It should be understood that an embodiment is an example of a possible implementation of any features and/or elements presented in the attached claims. Some embodiments have been described for the purpose of illuminating one or more of the potential ways in which the specific features and/or elements of the attached claims fulfill the requirements of uniqueness, utility and non-obviousness.

Use of the phrases and/or terms including, but not limited to, "a first embodiment," "a further embodiment," "an alternate embodiment," "one embodiment," "an embodiment," "multiple embodiments," "some embodiments," "other embodiments," "further embodiment", "furthermore embodiment", "additional embodiment" or variants thereof do not necessarily refer to the same embodiments. Unless otherwise specified, one or more particular features and/or elements described in connection with one or more embodiments may be found in one embodiment, or may be found in more than one embodiment, or may be found in all embodiments, or may be found in no embodiments. Although one or more features and/or elements may be described herein in the context of only a single embodiment, or alternatively in the context of more than one embodiment, or further alternatively in the context of all embodiments, the features and/or elements may instead be provided separately or in any appropriate combination or not at all. Conversely, any features and/or elements described in the context of separate embodiments may alternatively be realized as existing together in the context of a single embodiment.

Any particular and all details set forth herein are used in the context of some embodiments and therefore should not be necessarily taken as limiting factors to the attached claims. The attached claims and their legal equivalents can be realized in the context of embodiments other than the ones used as illustrative examples in the description below.

Embodiments of the present invention will be described below in detail with reference to the accompanying drawings.

The present disclosure provides an inlet diffuser for the fixed-bed reactor for uniform liquid distribution on a catalyst bed. The present disclosure considers the effects associated with swirling motion and liquid flow is in one direction creating liquid level gradient on the tray caused by inlet nozzles and proposes an inlet diffuser design to eliminate the problems associated with said fluid motion. The primary objective of the present disclosure is to provide an inlet diffuser for down-flow fixed bed reactor for distributing fluid on the distribution tray.

Another objective of the present disclosure is to provide the inlet diffuser with a low fluid velocity and thus, preventing erosion in reactor shell.

Yet, another objective of the present disclosure is to provide the inlet diffuser with such fluid velocity so as to prevent ripple effect on the distribution tray and thus, leading to a uniform liquid level on the distribution tray which results in uniform liquid flow from all the distribution units.

FIG. 1 illustrates schematic view of an inlet diffuser 100 for a fixed-bed reactor 200, in accordance with another embodiment of the present disclosure. The fixed-bed reactor 200 may interchangeably be referred to as the hydroprocessing fixed-bed reactor 200 or the reactor 200, without departing from the scope of the present disclosure. In an embodiment, the inlet diffuser 100 may be implemented in the reactor 200 for uniform distribution of a gas-liquid mixture on a catalyst bed 206 in the reactor 200. The reactor 200 may also comprise a distribution tray 202 positioned between the catalyst bed 206 and the inlet diffuser 100 to distribute the gas-liquid mixture on the catalyst bed 206.

In an embodiment, the inlet diffuser 100 may be placed downstream to a feed pipe 102 in the reactor 200. The term 'downstream' herein referred to a flow of the gas-liquid mixture, without departing from the scope of the present disclosure. In an embodiment, the feed pipe 102 may be embodied as a hollow cylindrical structure formed of a material that may be non-reactive to the gas-liquid mixture flowing through the feed pipe 102.

In an embodiment, the feed pipe 102 may include a horizontal portion, a bent portion, and, a vertical portion oriented at 90 degrees with respect to the horizontal portion. The bent portion may connect the horizontal portion to the vertical portion. The vertical portion of the feed pipe 102 may be connected to the inlet diffuser 100. A diameter of the feed pipe 102 may depend on various factors including, but not limited to, a size of the reactor 200, a rate of reaction, and the flow of the gas-liquid mixture. The gas-liquid mixture may flow through the horizontal portion of the feed pipe 102 and subsequently pass through the bent portion to enter into the vertical portion of the feed pipe 102. The flow of the gas-liquid mixture through the bent portion, interchangeably referred to as the elbow portion, of the feed pipe 102 may cause a restriction in the flow, and thereby reducing a velocity of fluid, i.e., the gas-liquid mixture. The gas-liquid mixture may enter the reactor 200 through the vertical portion of the feed pipe 102 at 90 degrees and flow through the inlet diffuser 100 positioned at an inlet of the reactor 200 below the feed pipe 102.

In an embodiment, the inlet diffuser 100 may comprise a truncated cone 106 positioned downstream to the feed pipe 102. The truncated cone may have two circular end portions, i.e., an upper portion and a bottom portion. In an embodiment, a diameter of the bottom portion of the truncated cone 106 may be less than a diameter of the inlet diffuser 100. Further, in an embodiment, the diameter of the bottom portion of the truncated cone 106 may be greater than a diameter of a upper portion of the truncated cone 106. The truncated cone 106 may be adapted to receive a stream of the gas-liquid mixture from the feed pipe 102. The gas-liquid mixture may flow downwards through the truncated cone 106. As the gas-liquid mixture flows from the upper portion to the bottom portion, the velocity of the fluid decreases in a direction of the flow due to the increase in an area of the truncated cone 106 from the upper portion to the bottom portion.

In an embodiment, the inlet diffuser 100 may comprise at least one horizontal baffle 104 coupled to the truncated cone 106 and adapted to absorb momentum of the stream received by the truncated cone 106. In an embodiment, the horizontal baffle 104 may be positioned at the upper portion of the truncated cone 106. A length of the horizontal baffle 104 may be equal to the diameter of the feed pipe 102. The gas-liquid mixture, after leaving the feed pipe 102, may get deflected by the at least one horizontal baffle 104 at the upper portion of the truncated cone 106 and subsequently enters in the truncated cone 106.

Further, the truncated cone 106 may comprise at least one opening 110 formed on a circumference of the truncated cone 106. The at least one opening 110 may interchangeably be referred to as the circumferential openings. Further, the circumferential openings may individually be referred to as the circumferential opening. In an embodiment, the truncated cone 106 may comprise four circumferential openings 110, without departing from the scope of the present disclosure. In an embodiment, each of the circumferential openings 110 may have a rectangular shape. In another embodiment, each of the circumferential openings 110 may have a square shape. Further, in an embodiment, each of the circumferential openings 110 may have equal width. Each of the circumferential openings 110 may be distributed on the circumference such that a distance between the two consecutive circumferential openings 110 may be equal.

In an embodiment, each of the circumferential openings 110 may comprise a vertical baffle plate 120 dividing each of the circumferential openings 110 into two parts. Each of the vertical baffle plates 120 may divide each of the circumferential openings 110 into two equal parts. The stream may enter the truncated cone 106 and spill out of each of the circumferential openings 110 that is divided in two equal parts by the vertical baffle plate 120. The vertical baffle plates 120 positioned in the circumferential openings 110 may break the stream of the gas-liquid mixture and thereby, lowering the velocity of the fluid.

Further, the inlet diffuser 100 may further comprise a cylindrical chamber 112 in fluid communication with the truncated cone 106 and adapted to receive the stream from the truncated cone 106. In an embodiment, the cylindrical chamber 112 includes a top portion 122 coupled to a bottom portion 124. A diameter of the cylindrical chamber 112 may be greater than the diameter of the bottom portion of the truncated cone 106. Further, in an embodiment, the diameter of the cylindrical chamber 112 may be equal to the diameter of the inlet diffuser 100. In an embodiment, a circumference of the cylindrical chamber 112 may coincide with the circumference of the inlet diffuser 112. The bottom portion of the cone is opening into a cylindrical chamber having 5-15% of reactor cross sectional area depending on the reactor diameter.

In an embodiment, the cylindrical chamber 112 may include at least one slot 114 formed on a circumference of the cylindrical chamber 112. The at least one slot 114 may interchangeably be referred to as the slots 114, without departing from the scope of the present disclosure. The slots 114 may be adapted to discharge the stream from the inlet diffuser 100. The slots 114 formed on the circumference of the cylindrical chamber 112 may have a rectangular shape. Further, a size of each of the slots may be equal, without departing from the scope of the present disclosure. The slots 114 may be distributed on the circumference of the cylindrical chamber 112 such that a distance between the two consecutive slots 114 may be equal. The stream of the gas-liquid mixture, while flowing through the cylindrical chamber 112, may be discharged from the slots 114 on the circumference in all the directions. The velocity of the fluid may be reduced by the slots 114. Further, equal size of the slots 114 may also lead to uniform discharge of the stream from the slots 114. Further, the stream may also be discharged from the cylindrical chamber 112 in the downward direction through a splash plate 116.

The inlet diffuser 100 may comprise the splash plate 116 disposed at a bottom portion of the cylindrical chamber 112. In an embodiment, a diameter of the splash plate 116 may be equal to the diameter of the cylindrical chamber 112. The splash plate 116 may comprise one or more apertures 118 adapted to discharge the stream from the inlet diffuser 100 in the downward direction. In an embodiment, the one or more apertures 118 on the splash plate 116 may have a circular shape, without departing from the scope of the present disclosure. The splash plate 116 may break the stream and discharge it evenly out of the inlet diffuser 110. Therefore, as a result of the discharge from the circumferential slots 114 on the cylindrical chamber 112 and the apertures 118 on the splash plate 116, the stream of gas-liquid mixture gets dispersed uniformly from all the directions.

Figure 2:
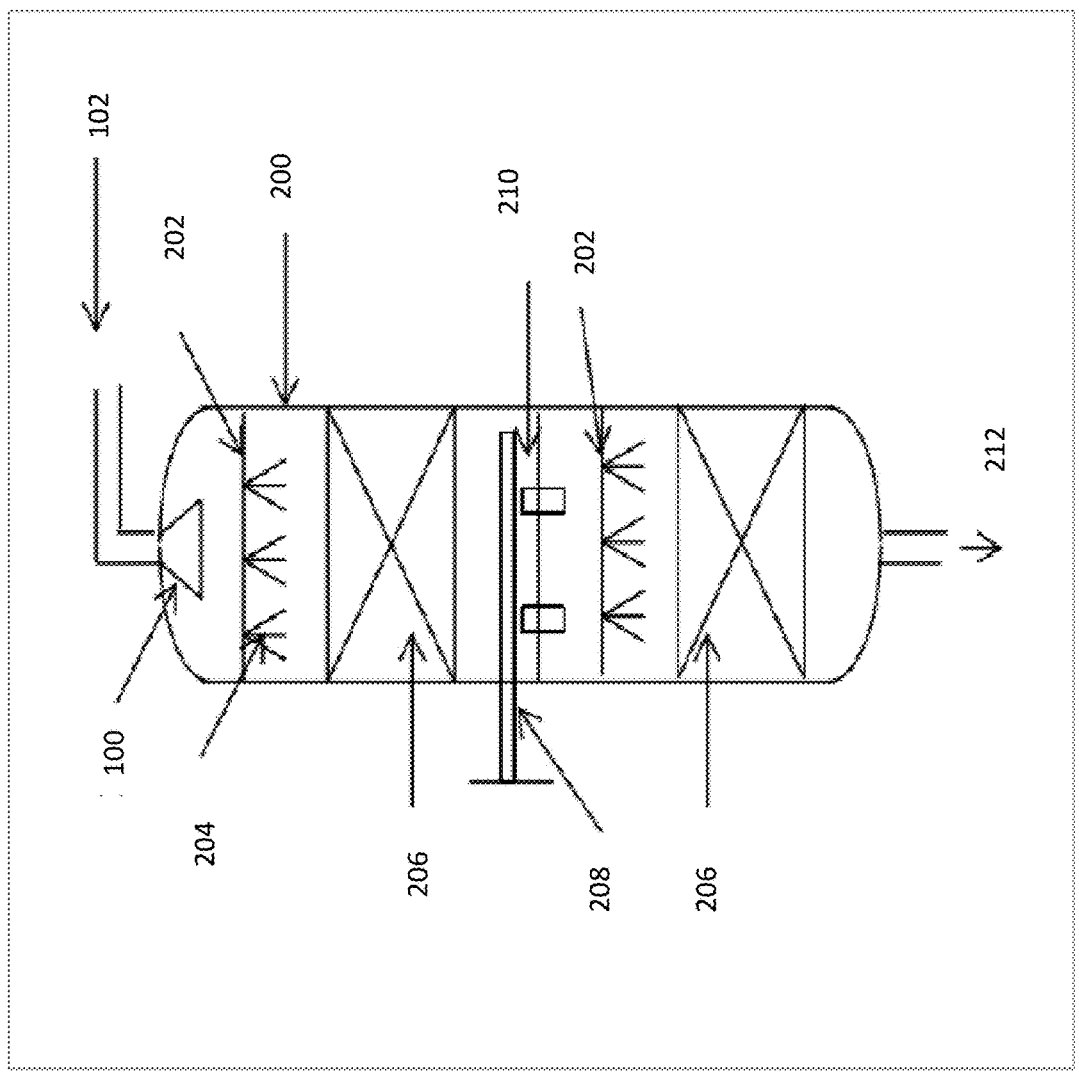
FIG. 2 illustrates a schematic view of the fixed-bed reactor for uniform liquid distribution, in accordance with an embodiment of the present disclosure.

FIG. 2 illustrates a schematic view of the fixed-bed reactor 200 for uniform liquid distribution, in accordance with an embodiment of the present disclosure. The reactor 200 may comprise the feed pipe 102, a catalyst bed 206, a distribution tray 202, the inlet diffuser 100, and an outlet 212. The inlet diffuser 100 may be implemented in the reactor 200 for uniform distribution of the stream of gas-liquid mixture on the catalyst bed 206. For the sake of brevity, the constructional and operational details of the components of the reactor 200 that have already been explained in the description of FIG. 1 are not explained in detail with respect to description of the FIG. 2.

The hydro-processing reactor 200 may be embodied as a fixed bed hydro-processing reactor. The hydro-processing reactor 200 may be employed in various chemical and petroleum refining industries for performing various chemical processes. In an embodiment, the hydro-processing reactor 200 may be employed for performing chemical process, including but not limited to, hydrocracking process and hydro-treating process. In an embodiment, the hydro-processing reactor 200 may be employed to perform the hydro-treating process for removing impurities from a hydrocarbon feedstock in presence of a gas, such as hydrogen gas, and a solid catalyst. In another embodiment, the hydro-processing reactor 200 may be employed to perform the hydro-cracking process for breaking down complex molecules in the hydrocarbon feedstock into simpler molecules, in presence of the hydrogen gas and the solid catalyst. Further, the present disclosure is explained with the hydro-processing reactor 200 embodied as three-phase fixed bed reactor, also referred to as trickle bed reactor. However, it should be appreciated by a person skilled in the art that it should not be construed as limiting, and the present disclosure is equally applicable to other types of the hydro-processing reactor 200 as well, without departing from the scope of the present disclosure. In an embodiment, the reactor 200 may be embodied as a three phase fixed-bed reactor, in which gas and liquid mixture flow downward over a fixed bed of solid catalyst.

The distribution tray 202 may be positioned downstream to the inlet diffuser 100 and above a catalyst bed area comprising the catalyst bed 206. The distribution tray 202 may comprise distribution units 204 for distributing the stream of gas-liquid mixture on the catalyst bed 206. Without departing from the scope of the present disclosure, the catalyst bed 206 may refer to the plurality of catalyst beds 206.

The catalyst bed 206 comprises a catalyst which receives the stream of gas-liquid mixture. The reactor 200 ensures that all the catalyst is contacted to all the gas-liquid mixture and hence enhancing the performance of the reactor 200.

In an embodiment, the hot stream of gas-liquid mixture flowing out of the catalyst bed 206 may enter a quench box 210 positioned downstream the catalyst bed 206. The hot gas-liquid mixture gets mixed with a quench gas 208 supplied to the quench box 210. The mixing of the quench gas 208 with the hot stream of gas-liquid mixture results in efficient heat and mass transfer with uniform composition. Also, the mixing of the quench gas 208 may maintain an even temperature profile in the catalyst bed 206 positioned below the quench box 210. In an embodiment, the reactor 200 may comprise another distribution tray 202 with distribution unit 204 positioned below the quench box 210. The distribution units 204 may uniformly distribute the quenched mixture on the catalyst bed area comprising another catalyst bed 206 in the lower portion of the reactor 200. Furthermore, once the reaction is done, the stream may leave the reactor 200 through an outlet 212.

As can be gathered, for effective utilization of catalyst during its guaranteed life, it is desirable to have uniform temperature profile in the radial section of the reactor 200, which can be achieved by uniform distribution of liquid. The hydroprocessing reactions are exothermic in nature and any maldistribution of reactants will lead to hotspot formation, as certain portion of the catalyst may remain devoid of the liquid. This could lead to sintering of the catalyst and it may lead to poor product quality, formation of undesired product and under utilization of reactor 200. Therefore, in order to overcome the shortcomings, the disclosed inlet diffuser 100 offers an enhanced performance. The inlet diffuser 100 of the reactor 200 facilitates even distribution of the gas-liquid mixture as it absorbs the momentum of incoming gas-liquid feed, calms it down and distributes it on distribution tray 202 to maintain uniform liquid level on the tray 202. The uniform liquid level on the distribution tray 202 plays a critical role in the uniform distribution of gas-liquid on catalyst bed 206. Further, the disclosed inlet diffuser 100 lowers the fluid velocity and thus, prevents erosion in reactor shell. Furthermore, the disclosed inlet diffuser 100 with low fluid velocity prevents ripple effect on the distribution tray 202 and thus, leads to a uniform liquid level on the distribution tray 202 resulting in a uniform liquid flow from all the distribution units 204. Also, the inlet diffuser 100 is simple in construction, economic, and easy to maintain.

The figures and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of the embodiments is by no means limited by these specific examples. Numerous variations, whether explicitly given in the specification or not, such as differences in structure, dimension, and use of material, are possible. The scope of the embodiments is at least as broad as given by the following claims.

We claim:

1. An inlet diffuser for a fixed-bed reactor, the inlet diffuser comprising:
    a truncated cone adapted to receive a stream of gas-liquid mixture, wherein the truncated cone includes one or more openings formed on a circumference of the truncated cone;
    a vertical baffle plate in each of the one or more openings in truncated cone to break the stream;
    at least one horizontal baffle coupled to the truncated cone and adapted to absorb momentum of the stream received by the truncated cone;
    a cylindrical chamber in fluid communication with the truncated cone and adapted to receive the stream from the truncated cone, wherein the cylindrical chamber includes one or more slots formed on a circumference of the cylindrical chamber and the one or more slots being adapted to discharge the stream from the inlet diffuser; and
    a splash plate disposed at a bottom portion of the cylindrical chamber and comprising one or more apertures adapted to discharge the stream from the inlet diffuser.

2. The inlet diffuser as claimed in claim 1, wherein a diameter of the bottom portion of the truncated cone is less than a diameter of the inlet diffuser.

3. The inlet diffuser as claimed in claim 1, wherein the diameter of the bottom portion of the truncated cone is more than a diameter of horizontal baffle of the truncated cone.

4. The inlet diffuser as claimed in claim 1, wherein a length of the horizontal baffle is less than the diameter of the cylindrical chamber.

5. The inlet diffuser as claimed in claim 1, wherein the one or more circumferential openings are of equal width and are arranged such that a distance between every two consecutive circumferential openings is equal.

6. The inlet diffuser as claimed in claim 1, wherein the cylindrical chamber includes a top portion coupled to a bottom portion of the truncated cone.

7. The inlet diffuser as claimed in claim 1, wherein the cylindrical chamber comprises 5-15% of a cross-sectional area of the fixed-bed reactor.

8. The inlet diffuser as claimed in claim 1, wherein the one or more slots on the circumference of the cylindrical chamber are rectangular in shape and each of the one or more slots are of equal size.

9. The inlet diffuser as claimed in claim 1, wherein the one or more apertures on the splash plate are circular in shape.

10. A fixed-bed reactor for uniform liquid distribution, the fixed-bed reactor comprising:
    a feed pipe for introducing a stream of gas-liquid mixture into the reactor;
    a catalyst bed comprising catalyst downstream to the feed pipe;
    a distribution tray above the catalyst bed and comprising distribution units for distributing the stream of gas-liquid mixture on the catalyst bed;
    an inlet diffuser between the feed pipe and the distribution tray for uniformly distributing the stream of gas-liquid mixture on the distribution tray; and
    an outlet for conveying the stream of gas-liquid mixture out of the reactor,
    wherein the inlet diffuser comprises:
        a truncated cone adapted to receive a stream of gas-liquid mixture, wherein the truncated cone includes at least one opening formed on a circumference of the truncated cone;
        a vertical baffle plate in each of the one or more openings in truncated cone to break the stream;
        at least one horizontal baffle coupled to the truncated cone and adapted to absorb momentum of the stream received by the truncated cone;
        a cylindrical chamber in fluid communication with the truncated cone and adapted to receive the stream from the truncated cone, wherein the cylindrical chamber includes at least one slot adapted to discharge the stream from the inlet diffuser; and
        a splash plate disposed at a bottom portion of the cylindrical chamber and comprising one or more apertures adapted to discharge the stream from the inlet diffuser.

* * * * *